(12) United States Patent
Tada

(10) Patent No.: US 7,539,575 B2
(45) Date of Patent: May 26, 2009

(54) NAVIGATION SYSTEM

(75) Inventor: Kenichiro Tada, Saitama (JP)

(73) Assignee: Pioneer Corporation, Tokyo (JP)

( * ) Notice: Subject to any disclaimer, the term of this patent is extended or adjusted under 35 U.S.C. 154(b) by 770 days.

(21) Appl. No.: 10/995,122

(22) Filed: Nov. 24, 2004

(65) Prior Publication Data

US 2005/0125149 A1 Jun. 9, 2005

(30) Foreign Application Priority Data

Nov. 27, 2003 (JP) ............................ P2003-396808

(51) Int. Cl.
*G01C 21/00* (2006.01)
*G06F 19/00* (2006.01)
(52) U.S. Cl. .................. 701/210; 701/208; 340/995.12
(58) Field of Classification Search .................. 701/210, 701/211, 201, 207, 208, 209; 340/995.12, 340/995.19
See application file for complete search history.

(56) References Cited

U.S. PATENT DOCUMENTS

| 6,314,369 | B1 * | 11/2001 | Ito et al. | ..................... | 701/209 |
| 6,484,093 | B1 * | 11/2002 | Ito et al. | ..................... | 701/211 |
| 6,728,630 | B1 * | 4/2004 | Burt et al. | ..................... | 701/202 |
| 6,954,694 | B2 * | 10/2005 | Nagamune | .................. | 701/200 |
| 2003/0204307 | A1 * | 10/2003 | Machii et al. | ............... | 701/208 |
| 2004/0044470 | A1 * | 3/2004 | Matsuoka et al. | ........... | 701/209 |

FOREIGN PATENT DOCUMENTS

| JP | 05-232867 A | 9/1993 |
| JP | 9-287970 A | 11/1997 |
| JP | 11-051669 A | 2/1999 |
| JP | 11-250395 A | 9/1999 |
| JP | 2000-180196 A | 6/2000 |
| JP | 2000-193473 A | 7/2000 |
| JP | 2001-050760 A | 2/2001 |
| JP | 2002-005671 A | 1/2002 |
| JP | 2002-296067 A | 10/2002 |
| JP | 2002-310699 A | 10/2002 |
| JP | 2002-340594 A | 11/2002 |
| JP | 2002-357428 A | 12/2002 |
| JP | 2003-287429 A | 10/2003 |

OTHER PUBLICATIONS

Japanese Office Action dated Jan. 6, 2009.

\* cited by examiner

*Primary Examiner*—Tan Q Nguyen
(74) *Attorney, Agent, or Firm*—Sughrue Mion, PLLC

(57) ABSTRACT

A navigation system has a navigation apparatus mounted on a vehicle, and a computer apparatus which is connected with the navigation apparatus to enable to communicates with the navigation apparatus. When the navigation apparatus receives route search information including recommended-route information from the computer apparatus, the navigation apparatus transmits a notice of completion of reception to the computer apparatus, generates traveling route information of the vehicle which moves on the basis of the route search information, and transmits guidance result information to the computer apparatus. The computer apparatus transmits recommended-route information which is generated on the basis of a predetermined algorithm, to the navigation apparatus, receives from the navigation apparatus the reception completion notice and the guidance result information including the traveling route information of the vehicle, and modifies the algorithm on the basis of the recommended-route information and the traveling route information.

11 Claims, 12 Drawing Sheets

FIG. 2

< ROUTE SEARCH INFORMATION >

| FIELD NAME | CONTENTS |
| --- | --- |
| RECOMMENDED-ROUTE IDENTIFYING ID | IDENTIFIER IDENTIFYING RECOMMENDED-ROUTE INFORMATION, AND HAVING VALUE WHICH IS UNIQUE IN COMPUTER APPARATUS |
| HOST ID | IDENTIFIER IDENTIFYING COMPUTER APPARATUS SERVING AS SOURCE, AND PREFERABLY HAVING VALUE WHICH IS UNIQUE IN THE WORLD |
| RECOMMENDED-ROUTE INFORMATION | INFORMATION SHOWING RECOMMENDED ROUTE FROM STARTING POINT TO DESTINATION |

FIG. 3

< RECEPTION COMPLETION NOTICE >

| FIELD NAME | CONTENTS |
| --- | --- |
| RECOMMENDED-ROUTE IDENTIFYING ID | IDENTIFIER IDENTIFYING RECOMMENDED-ROUTE INFORMATION, AND HAVING VALUE WHICH IS UNIQUE IN COMPUTER APPARATUS |
| TERMINAL ID | IDENTIFIER IDENTIFYING NAVIGATION APPARATUS SERVING AS SOURCE, AND PREFERABLY HAVING VALUE WHICH IS UNIQUE IN THE WORLD |

FIG. 4

< GUIDANCE HISTORY INFORMATION >

| FIELD NAME | CONTENTS |
| --- | --- |
| RECOMMENDED-ROUTE IDENTIFYING ID | IDENTIFIER IDENTIFYING RECOMMENDED-ROUTE INFORMATION, AND HAVING VALUE WHICH IS UNIQUE IN COMPUTER APPARATUS |
| TERMINAL ID | IDENTIFIER IDENTIFYING NAVIGATION APPARATUS SERVING AS SOURCE, AND PREFERABLY HAVING VALUE WHICH IS UNIQUE IN THE WORLD |
| RECOMMENDED-ROUTE INFORMATION | INFORMATION SHOWING RECOMMENDED ROUTE FROM STARTING POINT TO DESTINATION |

FIG. 5

< GUIDANCE RESULT INFORMATION >

| FIELD NAME | CONTENTS |
| --- | --- |
| RECOMMENDED-ROUTE IDENTIFYING ID | IDENTIFIER IDENTIFYING RECOMMENDED-ROUTE INFORMATION, AND HAVING VALUE WHICH IS UNIQUE IN COMPUTER APPARATUS |
| TERMINAL ID | IDENTIFIER IDENTIFYING NAVIGATION APPARATUS SERVING AS SOURCE, AND PREFERABLY HAVING VALUE WHICH IS UNIQUE IN THE WORLD |
| TRAVELING ROUTE INFORMATION | INFORMATION INDICATING TRAVEL ROUTE ALONG WHICH VEHICLE HAS PASSED IN ACTUAL TRAVELING FROM STARTING POINT TO DESTINATION |

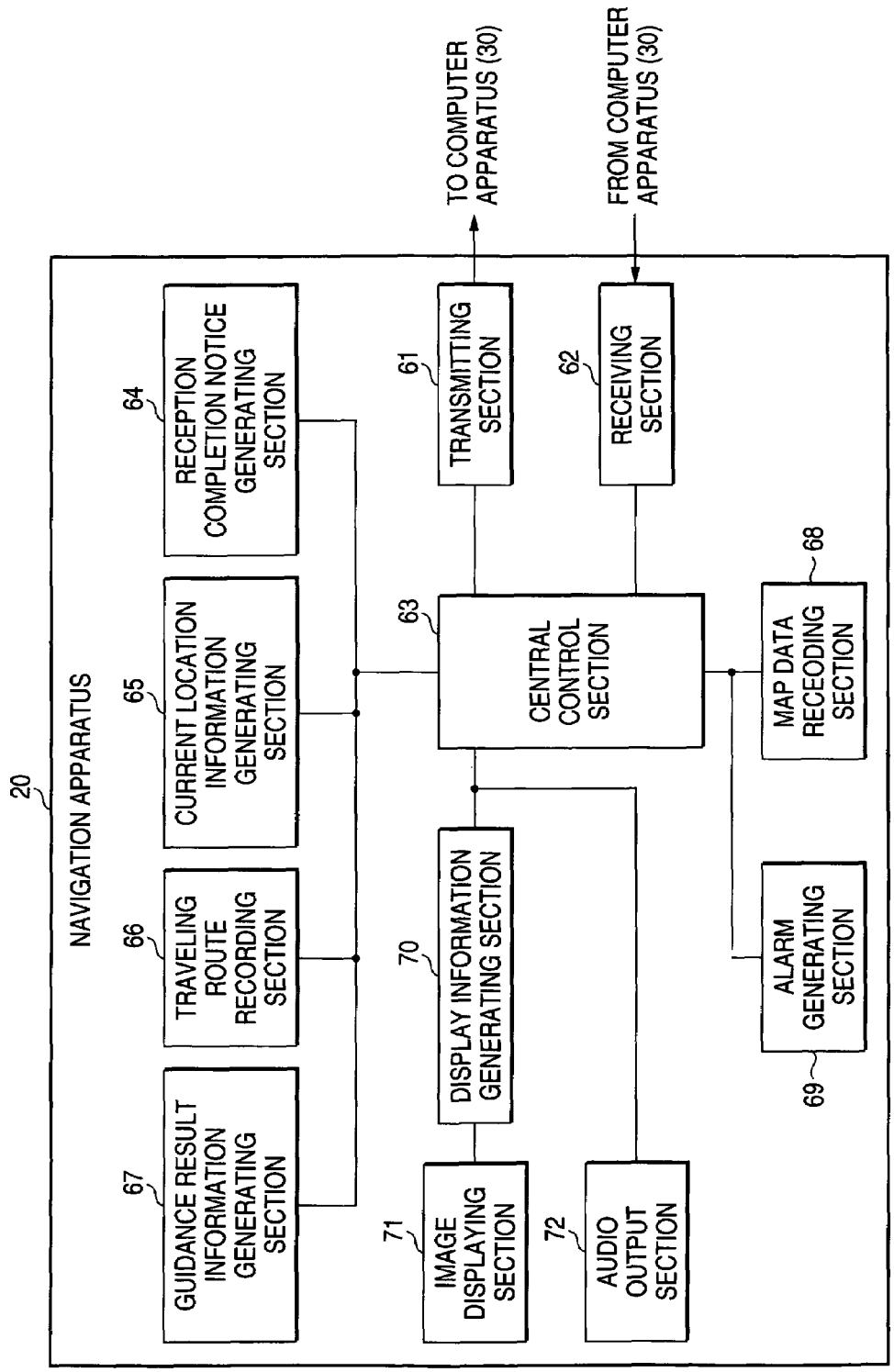

FIG. 14

< GUIDANCE HISTORY INFORMATION >

| FIELD NAME | CONTENTS |
|---|---|
| RECOMMENDED-ROUTE IDENTIFYING ID | IDENTIFIER IDENTIFYING RECOMMENDED-ROUTE INFORMATION, AND HAVING VALUE WHICH IS UNIQUE IN COMPUTER APPARATUS |
| GENERATION DATE AND TIME | FIELD IN WHICH DATE OF GENERATION OF GUIDANCE HISTORY INFORMATION IS RECORDED |
| AUTOMATIC-ERASURE INHIBITING FLAG | FLAG FOR INHIBITING RECORD FROM BEING AUTOMATICALLY ERASED BY COMPUTER APPARATUS 30 |
| HOST ID | IDENTIFIER IDENTIFYING COMPUTER APPARATUS SERVING AS SOURCE, AND PREFERABLY HAVING VALUE WHICH IS UNIQUE IN THE WORLD |
| RECOMMENDED-ROUTE INFORMATION | INFORMATION SHOWING RECOMMENDED ROUTE FROM STARTING POINT TO DESTINATION |

NAVIGATION SYSTEM

BACKGROUND OF THE INVENTION

1. Field of the Invention

The present invention relates to a navigation system for guiding a mobile unit such as a vehicle.

2. Description of the Related Art

Recently, among vehicles such as passenger cars, the number of vehicles on which a navigation apparatus is mounted is increasing. The navigation apparatus provides information for assisting driver's driving, such as a map and a recommended route. Specifically, a navigation apparatus reads out map data which are previously recorded as digital data on a recording medium in a vehicle such as a CD-ROM, a DVD-ROM, or a hard disk drive, from the recording medium, and displays a map on a display device on the basis of the map data. In response to an operation by the driver, moreover, the navigation apparatus calculates a guide route from the current location to a destination on the basis of a predetermined algorithm, and displays the calculated guide route on a the map displayed on the display device.

Some of conventional navigation apparatuses for a vehicle calculates a difference route between the guide route displayed on the display device and the actual travel route of the vehicle, and then conducts a learning process to reflect a result of the learning process into the next guide route, thereby providing a guide route suitable to the intention of the user (For example, see JP-A-9-287970, JP-A-2000-193473 and JP-A-2002-310699.).

Another navigation apparatus has been proposed which receives a result of a route search calculated by a large host computer disposed in the outside, and displays a guide route on a display device on the basis of the received route search result (See JP-A-2002-340594.).

JP-A-9-287970, JP-A-2000-193473, JP-A-2002-310699 and JP-A-2002-340594 are referred to as related art.

At the present, in a navigation system, a navigation apparatus disposed in a vehicle is operated to display a map and guide a route. By contrast, it is expected that, in the future, the function of communicating with a vehicle terminal or a personal computer in a house (hereinafter, referred to as home PC) is enhanced and therefore a navigation apparatus in a vehicle and the home PC are connected to communicate each other.

However, there is no framework for conducting communication between the home PC and the navigation apparatus to display a guide route, and causing the home PC to conduct a learning process on the basis of the difference between the displayed guide route and the actual travel route. Therefore, the home PC cannot conduct a route search in accordance with the taste of the user.

SUMMARY OF THE INVENTION

The object of the invention is to provide a navigation system in which a home PC communicates with a navigation apparatus, the home PC can conduct a route search in accordance with the taste of a user.

The invention provides a navigation apparatus, which is to be mounted on a mobile unit, and which enables to communicates with a computer apparatus through a communication network, having: a receiving section that receives route search information from the computer apparatus, the route search information including recommended-route information indicating a recommended route between two arbitrary points; a reception completion notice transmitting section that transmits a notice of completion of reception to the computer apparatus in accordance with reception of the route search information; a traveling route recording section that records a traveling route of the mobile unit which moves based on the route search information, and generates traveling route information; and a guidance result information transmitting section that transmits guidance result information to the computer apparatus based on the traveling route information.

The invention also provides a computer apparatus, which is connected with a navigation apparatus to be mounted on a mobile unit through a communication network so that the computer apparatus enables to communicate with the navigation apparatus, having: a recommended-route generating section that calculates a recommended route between two arbitrary points based on a recommended-route generation algorithm to generate recommended-route information; a route search information transmitting section that transmits route search information including the recommended-route information to the navigation apparatus; a first receiving section that receives a notice of completion of reception for the route search information transmitted from the navigation apparatus; a second receiving section that receives guidance result information including traveling route information of the mobile unit which moves based on the recommended-route information; and a learning section that conducts a learning process by modifying the recommended-route generation algorithm based on the recommended-route information and the traveling route information.

The invention also provides a navigation system having a navigation apparatus mounted on a mobile unit, and a computer apparatus which is connected with the navigation apparatus through a communication network so that the computer apparatus enables to communicate with the navigation apparatus, wherein the navigation apparatus has: a receiving section that receives route search information from the computer apparatus, the route search information including recommended-route information indicating a recommended route between two arbitrary points; a reception completion notice transmitting section that transmits a notice of completion of reception to the computer apparatus in accordance with reception of the route search information; a traveling route recording section that records a traveling route of the mobile unit which moves based on the route search information, and generates traveling route information; and a guidance result information transmitting section that transmits guidance result information to the computer apparatus based on the traveling route information, and the computer apparatus has: a recommended-route generating section that generates the recommended-route information based on a recommended-route generation algorithm; a route search information transmitting section that transmits the route search information including the recommended-route information to the navigation apparatus; a first receiving section that receives the notice of completion of reception for the route search information transmitted from the navigation apparatus; a second receiving section that receives guidance result information including the traveling route information of the mobile unit which moves based on the recommended-route information; and a learning section that conducts a learning process by modifying the recommended-route generation algorithm based on the recommended-route information and the traveling route information.

BRIEF DESCRIPTION OF THE DRAWINGS

FIG. 2 shows a table indicating the contents of route search information which is transmitted form a computer apparatus to a navigation apparatus;

FIG. 3 shows a table indicating the contents of a reception completion notice which is transmitted from the navigation apparatus to the computer apparatus;

FIG. 4 shows a table indicating the contents of guidance history information which is generated in the computer apparatus;

FIG. 5 shows a table indicating the contents of guidance result information which is transmitted from the navigation apparatus to the computer apparatus;

FIG. 6 is a block diagram illustrating the internal operation of the navigation apparatus;

FIG. 14 is a view showing an example of a screen display indicating a learning degree.

DETAILED DESCRIPTION OF THE PREFERRED EMBODIMENTS

Embodiments of a navigation system of the invention will be described with reference to the drawings.

First Embodiment

Figure 1:
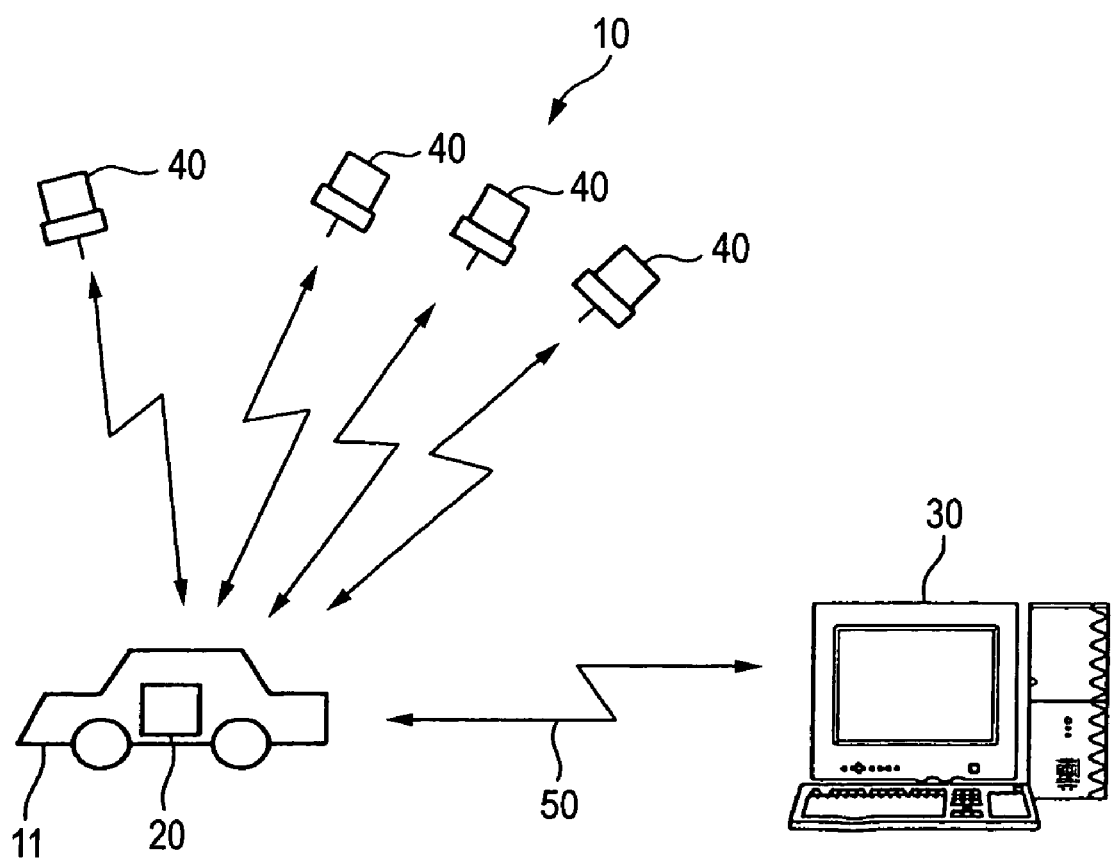
FIG. 1 is a diagram showing the whole configuration of a navigation system of a first embodiment of the invention.

FIG. 1 is a diagram showing the whole configuration of a navigation system of a first embodiment of the invention.

As shown in FIG. 1, a navigation system 10 of the embodiment is configured by a navigation apparatus 20 mounted on a vehicle 11 which is a mobile unit, and a computer apparatus 30 such as a personal computer which is disposed inside a house or the like.

The navigation apparatus 20 enables to communicate with the computer apparatus 30 through a network 50 based on, for example, the radio, so that, even when the vehicle 11 is in a remote place, data can be transmitted and received. The navigation apparatus 20 receives radio waves transmitted respectively from plural GPS satellites 40, obtains the current location of the vehicle 11 on the basis of the received radio waves, and displays the obtained current location on a map.

The navigation apparatus 20 can display a recommended route on a map which is displayed, in response to an operation by the user. The driver of the vehicle 11 can drive the vehicle to a destination in accordance with the recommended route.

When "route search information" including "recommended-route information" is received from the computer apparatus 30, the recommended route is displayed. When the route search information is received, the navigation apparatus 20 transmits "reception completion notice" to the computer apparatus 30, and, when the route guidance along the recommended route is ended in the vehicle 11, transmits "guidance result information" to the computer apparatus 30.

On the other hand, the computer apparatus 30 generates the route search information including the recommended-route information, and transmits the information to the navigation apparatus 20. The computer apparatus receives the guidance result information of the vehicle 11 from the navigation apparatus 20, and modifies a recommended-route generation algorithm on the basis of the received guidance result information, thereby generating a recommended route in accordance with the taste of the user.

In the following description, first, various information generated by the navigation apparatus 20 or the computer apparatus 30 will be described.

FIG. 2 shows a table indicating the contents of the route search information which is transmitted from the computer apparatus 30 to the navigation apparatus 20.

As shown in FIG. 2, the route search information is configured by a recommended-route identifying ID, a host ID, and recommended-route information. The recommended-route identifying ID is recommended-route identifying information for distinguishing the recommended-route information generated by the computer apparatus 30 from other recommended-route information, and has a value which is unique in the computer apparatus 30. The host ID is computer apparatus identifying information which is provided to distinguish the computer apparatus 30 from other computer apparatuses, and which is unique to the computer apparatus 30, and preferably has a value which is unique in the world. The recommended-route information is information including a route from the starting point to the destination which is generated by the computer apparatus 30. The generation of the recommended-route information will be described later in detail together with the computer apparatus 30.

FIG. 3 shows a table indicating the contents of the reception completion notice which is transmitted from the navigation apparatus 20 to the computer apparatus 30.

As shown in FIG. 3, the reception completion notice is configured by a recommended-route identifying ID and a terminal ID. The recommended-route identifying ID is identical with the recommended-route identifying ID in the received route search information, and is used for enabling the computer apparatus 30 which receives the reception completion notice, to know the route search information for which the reception completion notice is given. The terminal ID is a navigation apparatus identifying information which is provided to distinguish the navigation apparatus 20 from other navigation apparatus, and which is unique to the navigation apparatus 20, and preferably has a value which is unique in the world. Upon reception of the reception completion notice, the computer apparatus 30 generates "guidance history information".

FIG. 4 shows a table indicating the contents of the guidance history information which is generated in the computer apparatus 30.

As shown in FIG. 4, the guidance history information is configured by the recommended-route identifying ID, the terminal ID, and the recommended-route information. The guidance history information is generated by adding the transmitted recommended-route information to the recommended-route identifying ID and the terminal ID which are in the received reception completion notice.

FIG. 5 shows a table indicating the contents of the guidance result information which is transmitted from the navigation apparatus 20 to the computer apparatus 30.

The guidance result information is configured by the recommended-route identifying ID, the terminal ID, and traveling route information. The recommended-route identifying ID is identical with the recommended-route identifying ID in the received route search information. As described above, the terminal ID is a value which is unique to the navigation apparatus 20. The traveling route information shows the travel route along which the vehicle 11 has passed in the actual traveling from the starting point to the destination indicated in the recommended-route information. The traveling route information is generated by the navigation apparatus 20.

In the navigation system 10 of the embodiment, the above-described various information are transmitted and received by the navigation apparatus 20 and the computer apparatus 30, thereby constituting an integral navigation system.

Next, the navigation apparatus 20 and the computer apparatus 30 will be described in detail.

First, the navigation apparatus 20 will be described.

FIG. 6 is a block diagram illustrating the internal operation of the navigation apparatus 20.

The navigation apparatus 20 has a transmitting section 61, a receiving section 62, a central control section 63, a reception completion notice generating section 64, a guidance result information generating section 67, a current location information generating section 65, a traveling route recording section 66, a map data recording section 68, an alarm generating section 69, a display information generating section 70, an image displaying section 71, and an audio output section 72.

The transmitting section 61 is transmitting means for transmitting various data to the computer apparatus 30 through the network 50, and specifically transmits the reception completion notice and the guidance result information to the computer apparatus 30.

The receiving section 62 is receiving means for receiving various data transmitted from the computer apparatus 30, and specifically receives the route search information which is to be used in the route guidance. The transmitting section 61 and the receiving section 62 can be configured by, for example, an integral communication interface.

The central control section 63 integrally controls the function sections 61, 62, and 64 to 72 in the navigation apparatus 20. In the following description, it is assumed that the function sections 61, 62, and 64 to 72 receive and send data via the central control section 63.

In response to reception of the route search information via the receiving section 62, the reception completion notice generating section 64 generates the reception completion notice on the basis of the recommended-route identifying ID in the received route search information and the terminal ID of the navigation apparatus 20. The reception completion notice generated by the reception completion notice generating section 64 is transmitted via the transmitting section 61 to the computer apparatus 30 (reception completion notice transmitting section).

The current location information generating section 65 receives the radio waves transmitted respectively from the plural GPS satellites 40, calculates the current location of the vehicle 11 on which the navigation apparatus 20 is mounted, on the basis of the received radio waves, and outputs the calculated position as current location information. The current location information is sequentially generated at predetermined time intervals, and output in the sequence of generations.

The traveling route recording section 66 sequentially receives the current location information generated by the current location information generating section 65, and records the information in time sequence, thereby generating the traveling route information of the vehicle 11. Specifically, the traveling route recording section 66 accumulates the traveling route during a period from a timing when the route guidance based on the recommended-route information in the received route search information is started, to that when the vehicle reaches the destination, thereby recording the actual travel route of the vehicle 11 from the starting point to the destination.

The guidance result information generating section 67 is traveling route recording means for, after the route guidance for the vehicle 11 is ended, receiving the traveling route information generated by the traveling route recording section 66, and generating the guidance result information on the basis of the traveling route information, the recommended-route identifying ID, and the terminal ID. The generated guidance result information is transmitted via the transmitting section 61 to the computer apparatus 30 (guidance result information transmitting section).

The map data recording section 68 stores map data which are to be used in the route guidance by the navigation apparatus 20. The map data can be read out when the route guidance or the like is to be conducted.

The alarm generating section 69 is alarming means for, when a failure occurs in the navigation apparatus 20, or when a trouble is caused in the communication with the computer apparatus 30, generating an alarm. The alarm generated by the alarm generating section 69 is, for example, an alarm data to be displayed on a screen, and an alarm message for an audio output. Predetermined alarm data or alarm messages may be previously recorded.

The display information generating section 70 is a control section which generates display data on the basis of various data transmitted from the central control section 63. Specifically, the display information generating section 70 processes information so that the map data, the recommended-route information, the traveling route information, and the alarm data are displayed in a predetermined format.

The image displaying section 71 is a display device for providing the user with various information. A guidance map, a recommended route, the traveling route, and the like are displayed on the image displaying section 71 to assist the user in driving. When a failure of some kind occurs, an alarm message is displayed on the image displaying section 71 to request the user to take a countermeasure against the failure. The image displaying section 71 may be further provided with an input device such as a touch panel.

Figure 7:
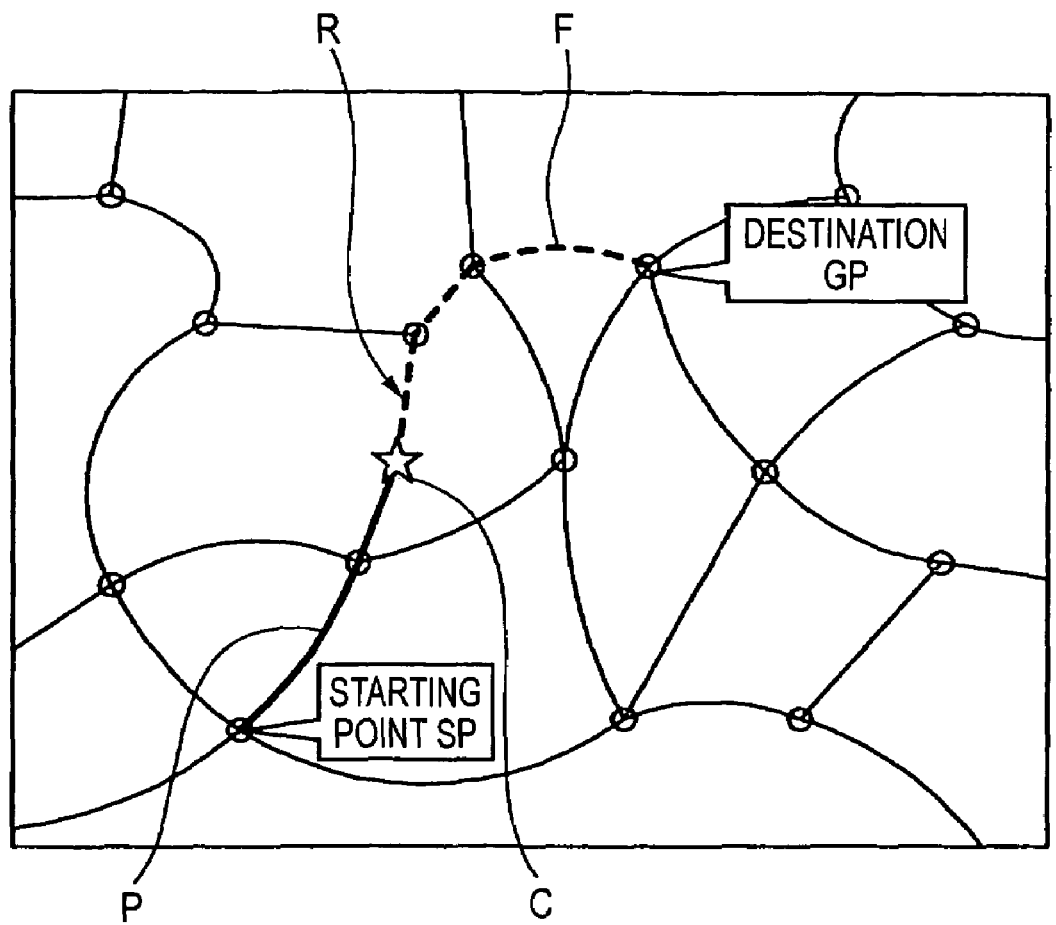
FIG. 7 shows an example of a guidance screen displayed on an image displaying section.

FIG. 7 shows an example of a guidance screen displayed on the image displaying section 71. In FIG. 7, the thin lines indicate roads, the circles indicate points of intersection, and the star sign C indicates the current location of the vehicle 11. The thick line indicates a recommended route R from the starting point SP to the destination GP. The solid line portion of the thick line indicates the route of traveling in which the vehicle 11 passed, and the broken line portion of the thick line indicates the recommended route portion in which the vehicle will pass. The image displaying section 71 conducts a display such as that shown in FIG. 7 to indicate to the user a map showing the starting point SP and the destination GP, the recommended route from the starting point SP to the destination GP, the current location of the vehicle 11 on the map, and the traveling route of the actual traveling, thereby guiding the route.

The audio output section 72 provides the user with audio route guidance, and is configured by a speaker and the like. When a failure of some kind occurs, the audio output section 72 outputs an alarm message by voice to request the user to take a countermeasure against the failure.

In the above, the navigation apparatus 20 has been described.

Next, the computer apparatus 30 will be described.

Figure 8:
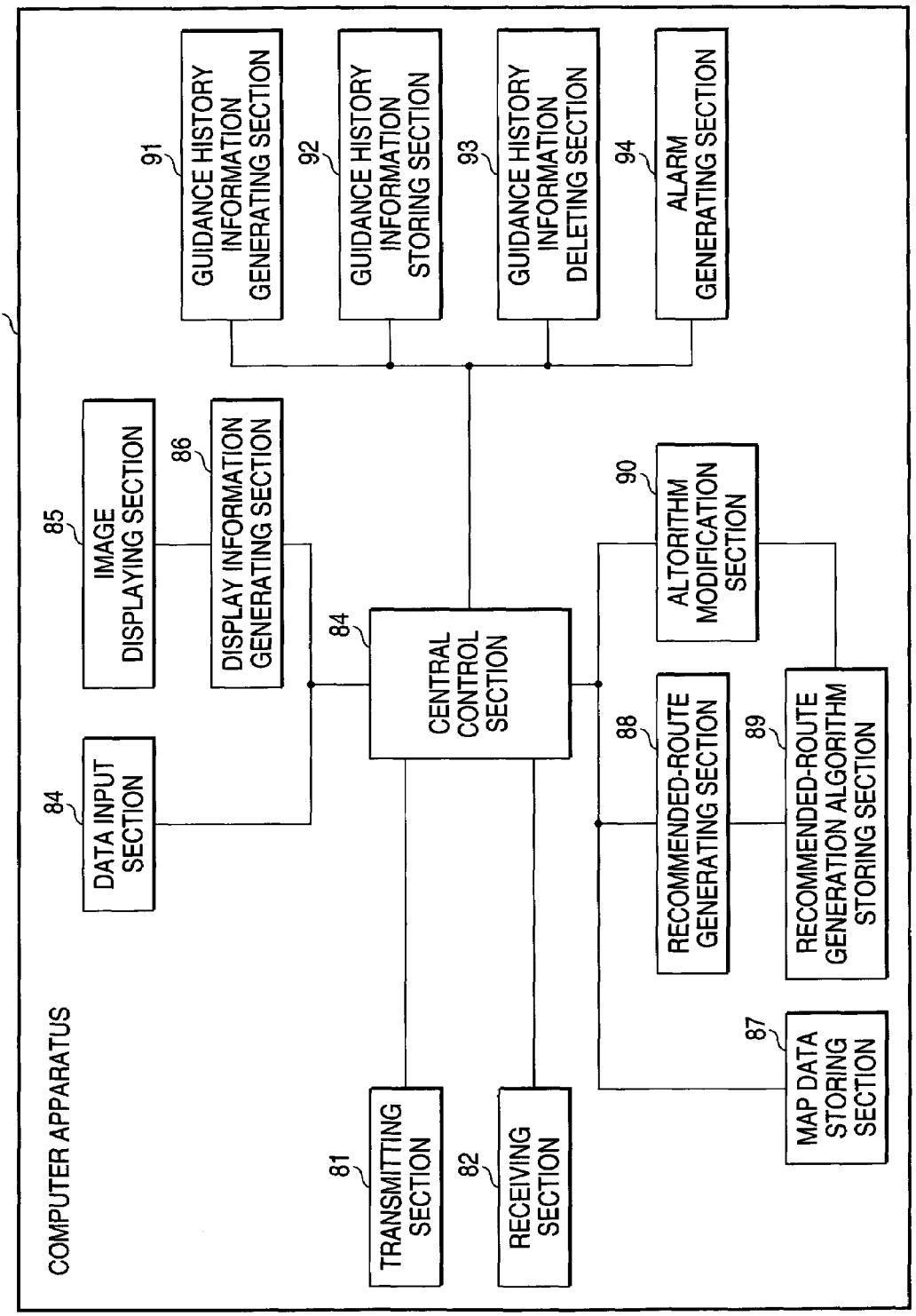
FIG. 8 is a block diagram illustrating the internal operation of the computer apparatus.

FIG. 8 is a block diagram illustrating the internal operation of the computer apparatus 30.

The computer apparatus 30 has a transmitting section 81, a receiving section 82, a central control section 83, a data input section 84, an image displaying section 85, a display information generating section 86, a map data storing section 87, a recommended-route generating section 88, a recommended-route generation algorithm storing section 89, an algorithm modifying section 90, a guidance history information generating section 91, a guidance history information storing section 92, a guidance history information deleting section 93, and an alarm generating section 94.

The transmitting section 81 is transmitting means for transmitting various data to the navigation apparatus 20 through the network 50, and specifically transmits the search result information to the navigation apparatus 20. The receiving section: 82 is receiving means for receiving various data transmitted from the navigation apparatus 20, and specifically receives the reception completion notice and the guidance result information. The transmitting section 81 and the receiving section 82 can be configured by, for example, an integral communication interface.

The central control section 83 integrally controls the function sections 81, 82, and 84 to 93 in the computer apparatus 30. In the following description, it is assumed that the function sections 81, 82, and 84 to 93 receive and send data via the central control section 83.

The data input section 84 is inputting means for enabling the user to input data into the computer apparatus 30, and is configured by inputting device such as a mouse and a keyboard. The user operates the computer apparatus 30 via the data input section 84 to implement processes such as designation of the starting point and destination in a route search, and the like, execution of a route search, browsing of the guidance history information, and deletion of the guidance history information.

The image displaying section 85 is a display device for providing the user with various information. A map for a route search, a calculated recommended route, the guidance history information, and the like are displayed on the image displaying section 85. While checking the image displaying section 85, the user operates the data input section to implement a route search and checking of history information. When a failure of some kind occurs, an alarm message is displayed on the image displaying section 85 to request the user to take a countermeasure against the failure.

The display information generating section 86 generates display data which are to be displayed on the image displaying section 85. The map for a route search, a recommended-route, the guidance history information, and the like are converted to data for display by the display information generating section 86, and then displayed.

The map data storing section 87 stores map data which are to be used in a route search and the like. The map data stored in the map data storing section 87 are identical with or correspond to those stored in the map data recording section 68 of the navigation apparatus 20.

The recommended-route generating section 88 is recommended-route generating means for generating a recommended route in a route search. The recommended-route generating section 88 calculates a recommended route on the basis of a recommended-route generation algorithm stored in the recommended-route generation algorithm storing section 89, and the map data stored in the map data storing section 87, thereby generating recommended-route information. The recommended-route generating section 88 adds the recommended-route identifying ID and the host ID to the generated recommended-route information to generate route search information, and temporarily stores the route search information. The generated route search information is transmitted via the transmitting section 81 to the navigation apparatus 20 (route search information transmitting section).

The algorithm modifying section 90 is learning means for modifying the recommended-route generation algorithm stored in the recommended-route generation algorithm storing section 89, thereby conducting a learning process. Specifically, the algorithm modifying section 90 compares the traveling route information in the guidance result information which is received via the receiving section 82, with the route search information generated by the recommended-route generating section 88, and modifies the recommended-route generation algorithm so as to enable a route search according to the taste of the user.

The guidance history information generating section 91 is guidance history information generating means for generating the guidance history information. The guidance history information generating section 91 receives the reception completion notice which is received via the receiving section 82, reads out the route search information which corresponds to the recommended-route identifying ID in the reception completion notice, and which is generated by the recommended-route generating section 88, from the recommended-route generating section 88, and generates the guidance history information on the basis of the recommended-route identifying ID, the terminal ID in the reception completion notice, and the route search information. The generated guidance history information is sent to the guidance history information storing section 92.

The guidance history information storing section 92 is storing means for storing the guidance history information generated by the guidance history information generating section 91.

The guidance history information deleting section 93 is guidance history information deleting means for deleting the guidance history information stored in the guidance history information storing section 92. In the embodiment, after the computer apparatus 30 receives the guidance result information and the algorithm modifying section 90 conducts a learning process, the guidance history information deleting section 93 deletes the guidance history information which is stored in the guidance history information storing section 92, and which corresponds to the received guidance result information.

The alarm generating section 94 is alarming means for, when a failure occurs in the computer apparatus 30, or when a trouble is caused in the communication with the navigation apparatus 20, generating an alarm. The alarm generated by the alarm generating section 94 is, for example, an alarm data to be displayed on a screen, and displayed on the image displaying section 85.

Next, the operation of the navigation system 10 of the embodiment will be specifically described with reference to the flowchart shown in FIG. 9.

Figure 9:
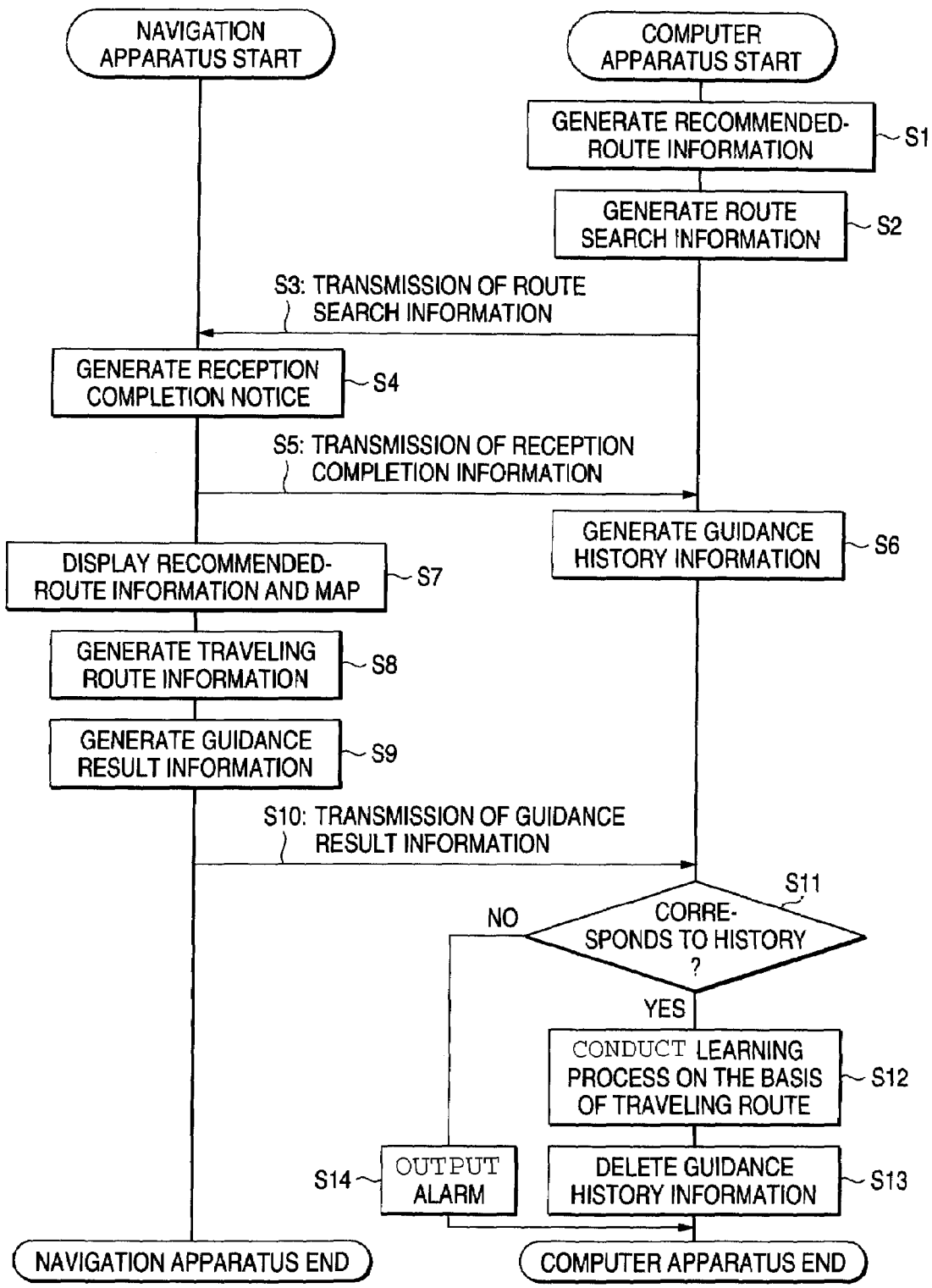
FIG. 9 is a flowchart showing processes of the navigation apparatus and the computer apparatus in the navigation system.

FIG. 9 is the flowchart showing processes of the navigation apparatus 20 and the computer apparatus 30 in the navigation system 10 of the embodiment.

In the computer apparatus 30, when instructions to generate a recommended route is input through the data input section 84, the recommended-route generating section 88 generates recommended-route information indicating a recommended route which is to be displayed on the navigation apparatus 20, in accordance with the starting point and the destination which are indicated in the recommended-route generation instructions (step S1) The recommended-route identifying ID for distinguishing the generated recommended-route information from other recommended-route information, and the host ID for identifying the computer apparatus are added to the generated recommended-route information to generate route search information to be transmitted (step S2). The generated route search information is transmitted to the navigation apparatus 20 via the transmitting section 81 (step S3).

When the navigation apparatus 20 receives the route search information from the computer apparatus 30, the reception completion notice generating section 64 generates the reception completion notice (step S4). The generated reception completion notice is transmitted to the computer apparatus 30 via the transmitting section 61 (step S5).

When the computer apparatus 30 receives the reception completion notice via the receiving section 82, the guidance history information generating section 91 reads out recommended-route information from the route search information which corresponds to the recommended-route identifying ID in the reception completion notice, and generates guidance history information together with the recommended-route identifying ID, and the terminal ID in the reception completion notice (step S6). The generated guidance history information is stored into the guidance history information storing section 92.

When there is no route search information corresponding to the recommended-route identifying ID in the received reception completion notice, or when the terminal ID is a terminal ID indicating an unknown terminal, the reception completion notice is ignored, and the control is ended. When there is no route search information, an error message may be transmitted to the navigation apparatus 20 to expedite retransmission.

In the navigation apparatus 20, when the user gets in the vehicle 11 and the route guidance is started, a map corresponding to the recommended-route information is displayed on the image displaying section 71, and a recommended route corresponding to the received recommended-route information is superimposed on the map to give the user the route guidance (step S7). The traveling route recording section 66 generates traveling route information in accordance with traveling of the vehicle 11 (step S8).

In the navigation apparatus 20, when the route guidance is ended, the guidance result information generating section 67 generates guidance result information on the basis of the generated traveling route information (step S9). The generated guidance result information is transmitted to the computer apparatus 30 via the transmitting section 61 (step S10).

When the computer apparatus 30 receives the guidance result information via the receiving section 82, a first checking process is conducted to compare the recommended-route identifying ID in the guidance result information with that in the guidance history information, thereby checking whether the received guidance result information corresponds to the guidance history information stored in the guidance history information storing section 92 or not. When the guidance history information corresponding to the received guidance result information is found, a second checking process is then conducted to compare both the terminal IDs with each other, thereby again checking whether the guidance result information corresponds to the guidance history information or not (step S11).

In the computer apparatus 30, when corresponding information is found as a result of the first checking process and corresponding information is further found as a result of the second checking process, the algorithm modifying section 90 compares the traveling route information in the received guidance result information with the transmitted recommended-route information, and modifies the recommended-route generation algorithm stored in the recommended-route generation algorithm storing section 89 on the basis of the traveling route information and the recommended-route information, thereby conducting a learning process (step S12). Then, the guidance history information stored in the guidance history information storing section 92 is deleted (step S13), and the control is ended.

By contrast, when one of the results of the first and second checking processes shows inconsistency, there is no route guidance information corresponding to the transmitted guidance result information. In the computer apparatus 30, therefore, the control proceeds to step S14 without conducing a learning process, to output an alarm via the alarm generating section 94 to the image displaying section 85, and to simultaneously output an error message to the navigation apparatus 20, and the control is then ended. In the navigation apparatus 20 which receives the error message, the alarm generating section 69 generates an alarm data or an alarm message, and the image displaying section 71 or the audio output section 72 outputs an alarm display or an alarm message.

As described above, in the navigation system 10 of the embodiment, the navigation apparatus 20 is disposed which is mounted on the vehicle 11 serving as a mobile unit, and which enables to communicate with the computer apparatus 30 through the network 50. In the navigation apparatus 20, the route search information including recommended-route information indicating a recommended route between two arbitrary points is received via the receiving section 62 from the computer apparatus 30 (receiving section), the reception completion notice is transmitted to the computer apparatus 30 in response to the reception of the route search information (reception completion notice transmitting section), the traveling route of the vehicle 11 which moves on the basis of the route search information is recorded to generate traveling route information (traveling route recording section), and the guidance result information is transmitted to the computer apparatus 30 on the basis of the traveling route information (guidance result information transmitting section).

Therefore, the navigation apparatus 20 can conduct the route guidance for the vehicle 11 on the basis of the route search information transmitted from the computer apparatus 30, record the traveling route of the vehicle 11 to generate traveling route information, and transmit the traveling route information to the computer apparatus 30. Even when the navigation apparatus 20 and the computer apparatus 30 are located respectively in remote places, consequently, the computer apparatus 30 can acquire traveling route information obtained by the navigation apparatus 20, and learn the taste of the user on the basis of the traveling route information. As a result, it is possible to provide the navigation system 10 in which the computer apparatus 30 can conduct a route search in accordance with the taste of the user, and which is therefore easily used by the user.

In the navigation apparatus 20 of the embodiment, the route search information includes: the host ID which is computer apparatus identifying information for identifying the computer apparatus 30; the recommended-route information; and the recommended-route identifying ID which is recommended-route identifying information for identifying the recommended-route information.

Therefore, the navigation apparatus 20 can identify the computer apparatus which has received the route search information, and transmit various information to a correct reply destination. Since the recommended-route identifying ID is disposed, the computer apparatus 30 which has received various information from the navigation apparatus 20 can identify corresponding recommended-route information.

In the navigation apparatus 20 of the embodiment, the reception completion notice generating section 64 generates the reception completion notice including the recommended-route identifying ID and the terminal ID, and, on the basis of the host ID, transmits the reception completion notice via the transmitting section 61 to the computer apparatus 30.

Therefore, the computer apparatus 30 can check whether the navigation apparatus 20 has surely received the route search information or not. The computer apparatus 30 may be configured so that, when it is failed to receive the reception completion notice from the navigation apparatus 20 within a predetermined period, the route search information is retransmitted.

In the navigation apparatus 20 of the embodiment, the guidance result information generating section 67 generates guidance result information including the recommended-route identifying ID, the traveling route information, and the terminal ID, and, on the basis of the host ID, transmits the guidance result information to the computer apparatus 30 via the transmitting section 61.

Therefore, the computer apparatus 30 can check whether the guidance result information transmitted from the navigation apparatus 20 corresponds to the route guidance information transmitted from the computer apparatus 30 or not.

In the embodiment, as the guidance result information, the navigation apparatus 20 transmits the recommended-route identifying ID, the traveling route information, and the terminal ID. The invention is not restricted to this. For example, the navigation apparatus 20 may be configured so as to transmit only the recommended-route identifying ID and the terminal ID as the guidance result information, and not to transmit the traveling route information to the computer apparatus 30 in the case where the terminal ID in the guidance result information fails to coincide with that in the reception completion notice, or where the recommended-route identifying ID in the guidance result information fails to coincide with that stored in the computer apparatus 30. According to the configuration, it is possible to reduce the volume of communication between the navigation apparatus 20 and the computer apparatus 30, and the navigation apparatus 20 can smoothly communicate with the computer apparatus 30.

The navigation apparatus 20 of the embodiment is configured so that, in the case where the terminal ID in the guidance result information transmitted to the computer apparatus 30 fails to coincide with that in the reception completion notice, or where the recommended-route identifying ID in the guidance result information fails to coincide with that stored in the computer apparatus 30, the alarm generating section 69 generates an alarm, and the alarm is issued through the image displaying section 71 or the audio output section 72.

Therefore, the user can know that the terminal ID in the guidance result information fails to coincide with that in the reception completion notice, or that the recommended-route identifying ID in the guidance result information fails to coincide with that stored in the computer apparatus 30, and take an adequate countermeasure.

In the navigation system 10 of the embodiment, the navigation apparatus 20 which is to be mounted on the vehicle 11 serving as a mobile unit, and the computer apparatus 30 which is connected to the navigation apparatus 20 through the network 50 so that the computer apparatus 30 enables to communicate with the navigation apparatus 20 are provided. In the computer apparatus 30, the recommended-route generating section 88 calculates a recommended route between two arbitrary points on the basis of the recommended-route generation algorithm, to generate recommended-route information, route search information including the recommended-route information is transmitted via the transmitting section 81 to the navigation apparatus, a reception completion notice for the route search information is received from the navigation apparatus 20 via the receiving section 82, guidance result information including traveling route information of the vehicle 11 which moved on the basis of the recommended-route information is received via the receiving section 82, and the algorithm modifying section serving as learning means modifies the recommended-route generation algorithm to conduct a learning process, on the basis of the recommended-route information and the traveling route information.

Therefore, the computer apparatus 30 transmits route guidance information to the navigation apparatus 20 so as to assist the route guidance of the navigation apparatus 20, and receives the guidance result information including the traveling route information from the navigation apparatus 20, so that the recommended-route generation algorithm can be modified. Even when the navigation apparatus 20 and the computer apparatus 30 are located respectively in remote places, consequently, the computer apparatus 30 can acquire traveling route information obtained by the navigation apparatus 20, and learn the taste of the user on the basis of the traveling route information. As a result, it is possible to provide the navigation system 10 in which the computer apparatus 30 can conduct a route search in accordance with the taste of the user, and which is therefore easily used by the user.

In the computer apparatus 30 of the embodiment, the reception completion notice includes the recommended-route identifying ID and the terminal ID, and the guidance history information generating section 91 generates guidance history information including the recommended-route identifying ID, the terminal ID, and the recommended-route information.

When guidance result information is received, therefore, the computer apparatus 30 can check the guidance history information, thereby enabling the received guidance result information to be judged whether it is to be transmitted or not.

In the computer apparatus 30 of the embodiment, the guidance history information includes the recommended-route identifying ID, the traveling route information, and the terminal ID, and the algorithm modifying section 90 checks the terminal ID in the guidance result information with that in the guidance history information, and checks the recommended-route identifying ID in the guidance result information with that in the guidance history information. Therefore, a learning process can be conducted only when the both kinds of information coincide with each other, and a learning process can be inhibited when one of the both kinds of information does not coincide with each other.

In the embodiment, the terminal ID in the guidance result information is checked with that in the guidance history information, and the recommended-route identifying ID in the guidance result information is checked with that in the guidance history information. When one of the results of the checkings shows inconsistency, an alarm is generated via the alarm generating section 94, so that the alarm can be displayed on the image displaying section 85.

Therefore, the user can know that the terminal ID in the guidance result information fails to coincide with that in the reception completion notice, or that the recommended-route identifying ID in the guidance result information fails to coincide with that stored in the computer apparatus 30, and take an adequate countermeasure.

In the embodiment described above, the guidance result information is transmitted after the route guidance by the navigation apparatus 20 is ended. Alternatively, the guidance result information may be automatically transmitted after the route guidance is ended, the user may operate the navigation apparatus 20 to generate the guidance result information and transmit the information to the computer apparatus 30, or the guidance result information may be transmitted in response to transmission instructions given by the computer apparatus 30.

In the embodiment described above, the navigation apparatus 20 has the map data which are identical with or correspond to those of the computer apparatus 30. The invention is not restricted to this. For example, related map data may be transmitted together with the route guidance information from the navigation apparatus 20 to the computer apparatus 30.

Second Embodiment

Figure 10:
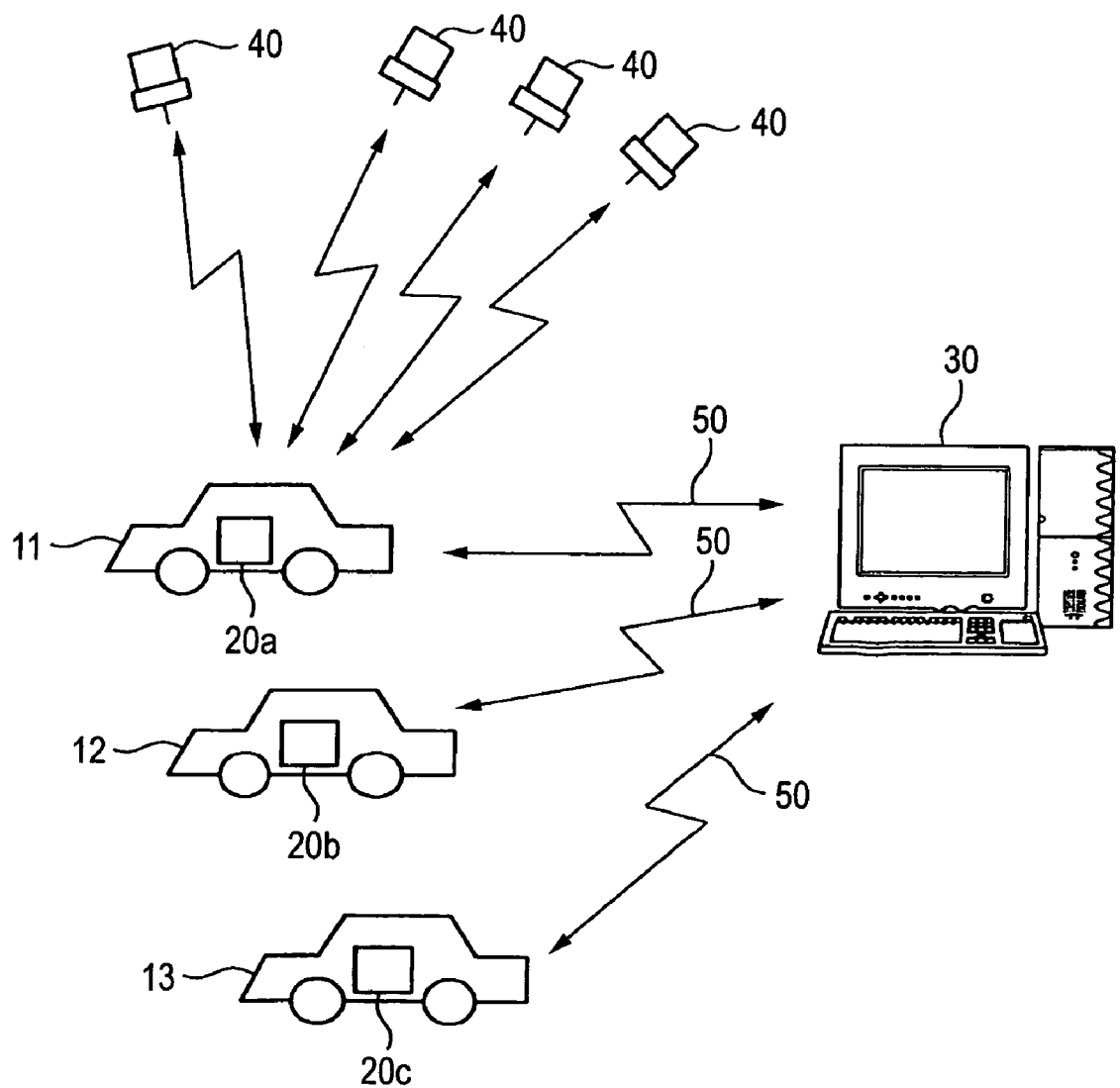
FIG. 10 is a diagram showing the whole configuration of a navigation system of a second embodiment of the invention.

FIG. 10 is a diagram showing the whole configuration of a navigation system of a second embodiment of the invention.

As shown in FIG. 10, the navigation system 100 of the embodiment is configured by plural navigation apparatuses 20a, 20b, 20c respectively mounted on plural vehicles 11, 12, 13 which are mobile units, and a computer apparatus 30 such as a personal computer which is disposed inside a house or the like.

In the embodiment, each of the navigation apparatuses 20a, 20b, 20c is identical with the navigation apparatus 20 of the first embodiment. The embodiment is fundamentally identical with the first embodiment except that the computer apparatus 30 communicates with the plural navigation apparatuses 20a, 20b, 20c.

In the embodiment, the guidance history information stored in the guidance history information storing section 92 of the computer apparatus 30 is stored in a ring buffer format in which information is sequentially arranged in a row in order of length of time of the history record. When new guidance history information is stored into the guidance history information storing section 92, the oldest guidance history information is deleted. According to the configuration, in the case where corresponding guidance result information is not obtained, or, even when route search information is transmitted to, for example, the navigation apparatus 20a, route guidance using the route search information is not actually conducted, there is a high possibility that the guidance history information is not necessary. In the configuration where the oldest guide history record is sequentially deleted, therefore, it is possible to save the storage area of the guidance history information storing section 92.

Next, the operation of the navigation system 100 of the embodiment will be specifically described with reference to FIGS. 11 and 12.

Figure 11:
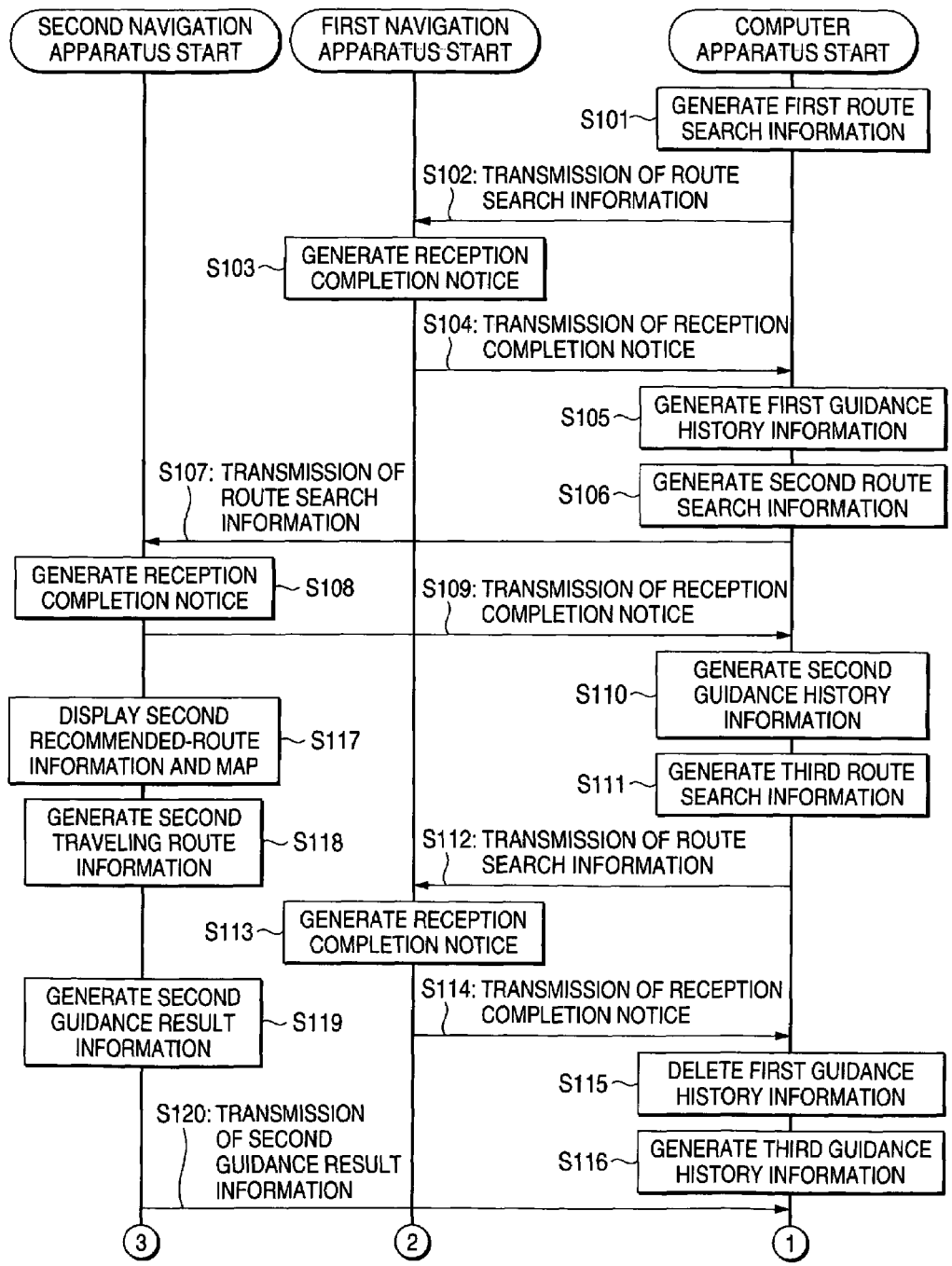
FIG. 11 is a flowchart showing an example of the process in the navigation system.
Figure 12:
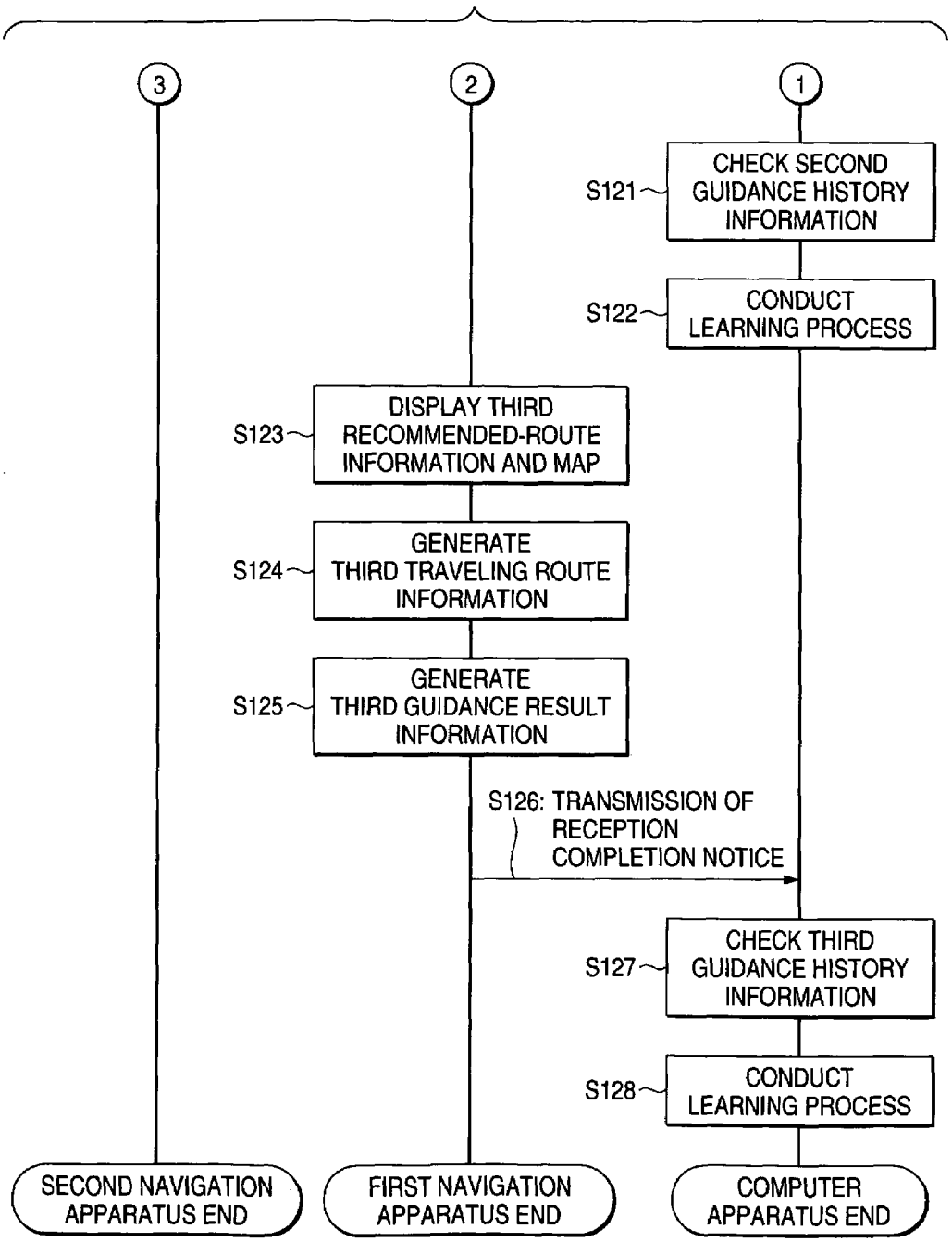
FIG. 12 is a flowchart showing an example of the process in the navigation system.

FIGS. 11 and 12 are flowcharts showing an example of the process in the navigation system 100 of the embodiment. In the following description, for the sake of simplicity of description, the operations of the first navigation apparatus 20a mounted on the vehicle 11, the second navigation apparatus 20b mounted on the vehicle 12, and the computer apparatus 30 will be described. In the following description, it is assumed that two sets of guidance history information can be stored into the guidance history information storing section 92.

In the computer apparatus 30, when instructions to generate a recommended route which is to be transmitted to the first navigation apparatus 20a is input through the data input section 84, the recommended-route generating section 88 generates first recommended-route information indicating a first recommended route which is to be displayed on the first navigation apparatus 20a, in accordance with the starting point and the destination which are indicated in the recommended-route generation instructions. The recommended-route identifying ID for distinguishing the generated first recommended-route information from other recommended-route information, and the host ID for identifying the computer apparatus are added to the generated first recommended-route information to generate first route search information to be transmitted (step S101). The generated first route search information is transmitted to the first navigation apparatus 20a via the transmitting section 81 (step S102).

When the first navigation apparatus 20a receives the first route search information from the computer apparatus 30, the reception completion notice generating section 64 generates the reception completion notice (step S103). The generated reception completion notice is transmitted to the computer apparatus 30 via the transmitting section 61 (step S104).

When the computer apparatus 30 receives the reception completion notice via the receiving section 82 from the first navigation apparatus 20a, the guidance history information generating section 91 reads out first recommended-route information from the first route search information which corresponds to the recommended-route identifying ID in the reception completion notice, and generates first guidance history information together with the recommended-route identifying ID, and the terminal ID in the reception completion notice (step S105). The generated first guidance history information is stored into the guidance history information storing section 92.

In the computer apparatus 30, when instructions to generate a recommended route which is to be transmitted to the second navigation apparatus 20b is then input through the data input section 84, the recommended-route generating section 88 generates second recommended-route information indicating a second recommended route which is to be displayed on the second navigation apparatus 20b, in accordance with the starting point and the destination which are indicated in the recommended-route generation instructions. The recommended-route identifying ID for distinguishing the generated second recommended-route information from other recommended-route information, and the host ID for identifying the computer apparatus are added to the generated second recommended-route information to generate second route search information to be transmitted (step S106). The generated second route search information is transmitted to the second navigation apparatus 20b via the transmitting section 81 (step S107).

When the second navigation apparatus 20*b* receives the second route search information from the computer apparatus 30, the reception completion notice generating section 64 generates the reception completion notice (step S108). The generated reception completion notice is transmitted to the computer apparatus 30 via the transmitting section 61 (step S109).

When the computer apparatus 30 receives the reception completion notice via the receiving section 82 from the second navigation apparatus 20*b*, the guidance history information generating section 91 reads out second recommended-route information from the second route search information which corresponds to the recommended-route identifying ID in the reception completion notice, and generates second guidance history information together with the recommended-route identifying ID, and the terminal ID in the reception completion notice (step S110). The generated second guidance history information is stored into the guidance history information storing section 92. At this timing, the number of guidance history information stored in the guidance history information storing section 92 is two.

In the computer apparatus 30, when instructions to generate a recommended route which is to be transmitted to the first navigation apparatus 20*a* is again input through the data input section 84, the recommended-route generating section 88 generates third recommended-route information indicating a third recommended route which is to be displayed on the first navigation apparatus 20*a*, in accordance with the starting point and the destination which are indicated in the recommended-route generation instructions. The recommended-route identifying ID for distinguishing the generated third recommended-route information from other recommended-route information, and the host ID for identifying the computer apparatus are added to the generated third recommended-route information to generate third route search information to be transmitted (step S111). The generated third route search information is transmitted to the first navigation apparatus 20*a* via the transmitting section 81 (step S112).

When the first navigation apparatus 20*a* receives the third route search information from the computer apparatus 30, the reception completion notice generating section 64 generates the reception completion notice (step S113). The generated reception completion notice is transmitted to the computer apparatus 30 via the transmitting section 61 (step S114).

When the computer apparatus 30 receives the reception completion notice via the receiving section 82 from the first navigation apparatus 20*a*, the guidance history information generating section 91 reads out third recommended-route information from the third route search information which corresponds to the recommended-route identifying ID in the reception completion notice, and generates third guidance history information together with the recommended-route identifying ID, and the terminal ID in the reception completion notice. The generated third guidance history information is stored into the guidance history information storing section 92. At this timing, two sets of guidance history information are stored in the guidance history information storing section 92. After the first guidance history information which is the oldest one is deleted (step S115), therefore, the third guidance history information is generated and stored into the guidance history information storing section 92 (step S116).

In the second navigation apparatus 20*b*, when the user gets in the vehicle 12 and the route guidance is started, a map corresponding to the second recommended-route information is displayed on the image displaying section 71, a recommended route corresponding to the received second recommended-route information is superimposed on the map to give the user the route guidance (step S117). The traveling route recording section 66 generates second traveling route information in accordance with traveling of the vehicle 12 (step S118).

In the second navigation apparatus 20*b*, when the route guidance is ended, the guidance result information generating section 67 generates second guidance result information on the basis of the generated second traveling route information (step S119). The generated second guidance result information is transmitted to the computer apparatus 30 via the transmitting section 61 (step S120).

When the computer apparatus 30 receives the second guidance result information via the receiving section 82, a first checking process is conducted to compare the recommended-route identifying ID in the second guidance result information with that in the second guidance history information, thereby checking whether the received second guidance result information corresponds to the second guidance history information stored in the guidance history information storing section 92 or not. When the second guidance history information corresponding to the received second guidance result information is found, a second checking process is then conducted to compare both the terminal IDs with each other, thereby again checking whether the second guidance result information corresponds to the second guidance history information or not (step S121).

In the computer apparatus 30, when corresponding information is found as a result of the first checking process and corresponding information is further found as a result of the second checking process, the algorithm modifying section 90 compares the second traveling route information in the received second guidance result information with the transmitted second recommended-route information, and modifies the recommended-route generation algorithm stored in the recommended-route generation algorithm storing section 89, on the basis of the second traveling route information and the second recommended-route information, thereby conducting a learning process (step S122). Then, the second guidance history information stored in the guidance history information storing section 92 is deleted.

By contrast, when one of the results of the first and second checking processes shows inconsistency, the computer apparatus 30 does not conduct a learning process and outputs an alarm or the like.

In the first navigation apparatus 20*a*, when the user gets in the vehicle 11 and the route guidance is started, a map corresponding to the third recommended-route information is displayed on the image displaying section 71, a recommended route corresponding to the received third recommended-route information is superimposed on the map to give the user the route guidance (step S123). The traveling route recording section 66 generates third traveling route information in accordance with traveling of the vehicle 11 (step S124).

In the first navigation apparatus 20*a*, when the route guidance is ended, the guidance result information generating section 67 generates third guidance result information on the basis of the generated third traveling route information (step S125). The generated third guidance result information is transmitted to the computer apparatus 30 via the transmitting section 61 (step S126).

When the computer apparatus 30 receives the third guidance result information via the receiving section 82, a first checking process is conducted to compare the recommended-route identifying ID in the third guidance result information with that in the third guidance history information, thereby checking whether the received third guidance result information corresponds to the third guidance history information stored in the guidance history information storing section 92 or not. When the third guidance history information corresponding to the received third guidance result information is found, a second checking process is then conducted to compare both the terminal IDs with each other, thereby again checking whether the third guidance result information corresponds to the third guidance history information or not (step S127).

In the computer apparatus 30, when corresponding information is found as a result of the first checking process and corresponding information is further found as a result of the second checking process, the algorithm modifying section 90 compares the third traveling route information in the received third guidance result information with the transmitted third recommended-route information, and modifies the recommended-route generation algorithm stored in the recommended-route generation algorithm storing section 89, on the basis of the third traveling route information and the third recommended-route information, thereby conducting a learning process (step S128). Then, the third guidance history information stored in the guidance history information storing section 92 is deleted.

By contrast, when one of the results of the first and second checking processes shows inconsistency, the computer apparatus 30 does not conduct a learning process and outputs an alarm or the like.

As described above, the navigation system 100 of the embodiment is configured by the plural navigation apparatuses 20*a*, 20*b*, 20*c*, and the computer apparatus 30. In this configuration also, each of the navigation apparatuses 20*a*, 20*b*, 20*c* can conduct the route guidance for the vehicle 11, 12, or 13 on the basis of the route search information transmitted from the computer apparatus 30, record the traveling route of the vehicle 11, 12, or 13 to generate traveling route information, and transmit the traveling route information to the computer apparatus 30. Even when the navigation apparatuses 20*a*, 20*b*, 20*c* and the computer apparatus 30 are located respectively in remote places, consequently, the computer apparatus 30 can acquire traveling route information obtained by the navigation apparatuses 20*a*, 20*b*, 20*c*, and learn the taste of the user on the basis of the traveling route information. As a result, it is possible to provide the navigation system 100 in which the computer apparatus 30 can conduct a route search in accordance with the taste of the user, and which is therefore easily used by the user.

In the embodiment, the guidance history information deleting section 93 for deleting guidance history information deletes the oldest guidance history information so that the number of sets of stored guidance history information does not exceed a predetermined number (in the above description, two). Therefore, it is possible to prevent unnecessary guidance history information from being uselessly stored, and hence the storage capacity for guidance history information can be effectively used.

In the embodiment, the recommended-route generation algorithm stored in the recommended-route generation algorithm storing section 89 may be configured so that different recommended-route generation algorithms are provided to the plural navigation apparatuses 20*a*, 20*b*, 20*c*, respectively. According to the configuration, when recommended-route information is to be transmitted to the navigation apparatus 20*a*, for example, the algorithm modifying section 90 serving as learning means can generate recommended-route information with using the recommended-route generation algorithm for the navigation apparatus 20*a*, and, when guidance result information is received from the navigation apparatus 20*a*, modify only the recommended-route generation algorithm for the navigation apparatus 20*a*. In this configuration, it is possible to generate recommended-route information in which the taste of the user of respective one of the navigation apparatuses 20*a*, 20*b*, 20*c* is reflected.

As shown in FIG. 14, guidance history information which is to be stored into the guidance history information storing section 92 may be configured so as to further has: a generation date and time field showing generation date information; an automatic-erasure inhibiting flag indicating that the guidance history information is inhibited from being automatically deleted; and a learning flag indicating whether or not a learning process has been conducted.

In the configuration of FIG. 14, the guidance history information deleting section 93 may be configured so as to delete guidance history information in which a predetermined time (for example, a predetermined days and hours) or more has passed since the date of generation of the guidance history information indicated by the generation date and time field. Since the automatic-erasure inhibiting flag is provided, guidance history information which the user wishes to be continuously stored can be set so as not to be deleted, by providing the guidance history information with deletion inhibition setting. Since the learning flag is provided, the guidance history information deleting section can operate so as to delete only guidance history information which has been subjected to a learning process, and in which deletion inhibition is not set.

Figure 13:
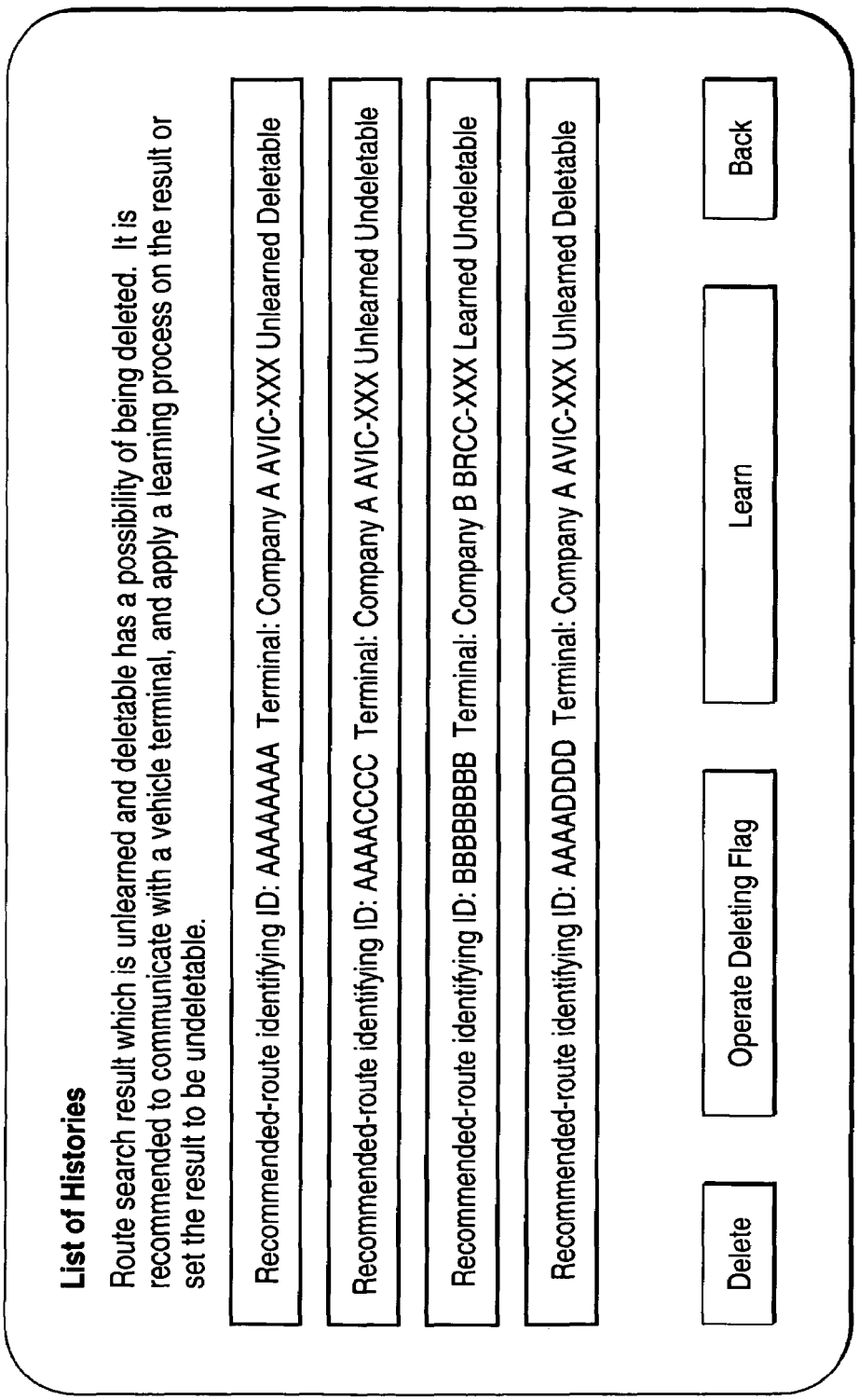
FIG. 13 shows a table indicating the contents of guidance history information which is generated in the computer apparatus.

Guidance history information may be configured as shown in FIG. 13. For each of recommended-route information in the guidance history information, learning information indicating whether a learning process has been conducted or not, and deletion inhibiting information may be displayed on the image displaying section as shown in FIG. 13. According to the configuration, the user can know guidance history information which has a possibility of being automatically deleted.

What is claimed is:

1. A computer apparatus, which is connected with a navigation apparatus to be mounted on a mobile unit through a communication network so that the computer apparatus enables to communicate with the navigation apparatus, comprising:

a recommended-route generating section that calculates a recommended route between two arbitrary points based on a recommended-route generation algorithm to generate recommended-route information;

a route search information transmitting section that transmits route search information including the recommended-route information to the navigation apparatus;

a first receiving section that receives a notice of completion of reception for the route search information transmitted from the navigation apparatus;

a second receiving section that receives guidance result information including traveling route information of the mobile unit which moves based on the recommended-route information; and a learning section that conducts a learning process by modifying the recommended-route generation algorithm based on the recommended-route information and the traveling route information.

2. The computer apparatus according to claim 1, wherein the route search information includes: computer apparatus identifying information which is to identify the computer apparatus; the recommended-route information; and recommended-route identifying information which is to identify the recommended-route information.

3. The computer apparatus according to claim 2, wherein the notice of completion of reception includes the recommended-route identifying information and navigation apparatus identifying information which is to identify the navigation apparatus, and the computer apparatus further comprises: a guidance history information generating section that generates guidance history information involving the recommended-route identifying information, the navigation apparatus identifying information and the recommended-route information.

4. The computer apparatus according to claim 3, wherein the guidance result information includes the recommended-route identifying information, the traveling route information and the navigation apparatus identifying information, and the learning section does not modify the recommended-route generation algorithm in a case where the navigation apparatus identifying information received by the second receiving section is inconsistent with the navigation apparatus identifying information in the guidance history information, or where the recommended-route identifying information received by the second receiving section is inconsistent with the recommended-route identifying information in the guidance history information.

5. The computer apparatus according to claim 3, further comprising:

an alarming section that displays an alarm in a case where the navigation apparatus identifying information received by the second receiving section is inconsistent with the navigation apparatus identifying information in the guidance history information, or where the recommended-route identifying information received by the second receiving section is inconsistent with the recommended-route identifying information in the guidance history information.

6. The computer apparatus according to claim 1, wherein the navigation apparatus is configured from a plurality of navigation apparatuses which are respectively placed in a plurality of mobile units, the recommended-route generation algorithm is given to each of the plurality of navigation apparatuses, and the learning section modifies the recommended-route generation algorithm for each of the plurality of navigation apparatuses.

7. The computer apparatus according to claim 1, wherein the guidance history information has a learning flag indicating whether or not a learning process is conducted on the recommended-route generation algorithm for generating a recommended route, and when the learning process is conducted on the recommended-route generation algorithm, the learning section set the learning flag to a value indicating that the learning process is conducted.

8. The computer apparatus according to claim 1, further comprising:

a guidance history information deleting section that deletes the guidance history information, wherein the guidance history information deleting section deletes oldest guidance history information to prevent the number of stored guidance history information from exceeding a predetermined number.

9. The computer apparatus according to claim 1, further comprising:

a guidance history information deleting section that deletes the guidance history information, wherein the guidance history information has generation date information indicating a date of generation when the recommended-route information is generated, and the guidance history information deleting section deletes guidance history information in which a predetermined time has passed since a date of generation indicated by the generation date information.

10. The computer apparatus according to claim 1, wherein the guidance history information has an automatic-erasure inhibiting flag indicating whether or not automatic erasure is enabled, and the guidance history information deleting section deletes guidance history information in which the automatic-erasure inhibiting flag does not indicate that automatic erasure is disabled.

11. A navigation system comprising a navigation apparatus mounted on a mobile unit, and a computer apparatus which is connected with the navigation apparatus through a communication network so that the computer apparatus enables to communicate with the navigation apparatus, wherein the navigation apparatus comprises:

a receiving section that receives route search information from the computer apparatus, the route search information including recommended-route information indicating a recommended route between two arbitrary points;

a reception completion notice transmitting section that transmits a notice of completion of reception to the computer apparatus in accordance with reception of the route search information;

a traveling route recording section that records a traveling route of the mobile unit which moves based on the route search information, and generates traveling route information; and a guidance result information transmitting section that transmits guidance result information to the computer apparatus based on the traveling route information, and the computer apparatus comprises:

a recommended-route generating section that generates the recommended-route information based on a recommended-route generation algorithm;

a route search information transmitting section that transmits the route search information including the recommended-route information to the navigation apparatus;

a first receiving section that receives the notice of completion of reception for the route search information transmitted from the navigation apparatus;

a second receiving section that receives guidance result information including the traveling route information of the mobile unit which moves based on the recommended-route information; and a learning section that conducts a learning process by modifying the recommended-route generation algorithm based on the recommended-route information and the traveling route information.

* * * * *